United States Patent
Koishikawa (10) Patent No.: US 11,214,099 B2
(45) Date of Patent: Jan. 4, 2022

(54) PNEUMATIC TIRE (71) Applicant: The Yokohama Rubber Co., LTD., Tokyo (JP)

(72) Inventor: Yoshifumi Koishikawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 1057 days.

(21) Appl. No.: 14/891,151

(22) PCT Filed: Apr. 9, 2014

(86) PCT No.: PCT/JP2014/060305
§ 371 (c)(1),
(2) Date: Nov. 13, 2015

(87) PCT Pub. No.: WO2014/185198
PCT Pub. Date: Nov. 20, 2014

(65) Prior Publication Data
US 2016/0082778 A1    Mar. 24, 2016

(30) Foreign Application Priority Data
May 13, 2013  (JP) .............................. JP2013-101088

(51) Int. Cl.
*B60C 11/03*    (2006.01)

(52) U.S. Cl.
CPC ...... *B60C 11/0318* (2013.01); *B60C 11/0327* (2013.01); *B60C 11/0304* (2013.01);
(Continued)

(58) Field of Classification Search
CPC ............. B60C 11/0318; B60C 11/0327; B60C 11/0304; B60C 11/0306; B60C 11/12;
(Continued)

(56) References Cited

U.S. PATENT DOCUMENTS

| | | | | |
|---|---|---|---|---|
| 4,777,993 A | * | 10/1988 | Yamashita | .......... B60C 11/0318 |
| | | | | 152/209.3 |
| 5,309,964 A | * | 5/1994 | Kogure | ............... B60C 11/0318 |
| | | | | 152/209.2 |
| 5,618,360 A | | 4/1997 | Sakuno | |
| 6,415,836 B1 | | 7/2002 | Hanya | |

(Continued)

FOREIGN PATENT DOCUMENTS

| | | |
|---|---|---|
| CN | 101570113 | 11/2009 |
| JP | S60-082408 | 5/1985 |

(Continued)

OTHER PUBLICATIONS

Machine translation of JP2007-168572 (No date).*

(Continued)

*Primary Examiner* — Katelyn W Smith
*Assistant Examiner* — Philip N Schwartz
(74) *Attorney, Agent, or Firm* — Thorpe North & Western (57) ABSTRACT

Provided is a pneumatic tire that can be obtained without requiring complicated design and has improved noise performance. On the inner vehicle-mounting side, the circumferential pitch length of the tire has pitch variation comprising at least three pitch lengths and, if the number of pitches is n and the pitch lengths (Pi) are Pi1, Pi2, Pi3, . . . , Pin, in order from the greatest pitch length, the pitch lengths satisfy the relationships $Pi1/Pi2 \le Pi2/Pi3 \le \ldots \le Pin-1/Pin$, and $Pi1/Pi2$.

20 Claims, 3 Drawing Sheets

(52) U.S. Cl.
CPC ............... *B60C 2011/039* (2013.01); *B60C 2011/0341* (2013.01); *B60C 2011/0348* (2013.01); *B60C 2011/0358* (2013.01); *B60C 2011/0381* (2013.01); *B60C 2011/0388* (2013.01)

(58) Field of Classification Search
CPC ..... B60C 2011/0325; B60C 2011/0341; B60C 2011/0358; B60C 2011/039; B60C 2011/0388; B60C 2011/0348; B60C 2011/0381; B60C 2011/0337
See application file for complete search history.

(56) References Cited

U.S. PATENT DOCUMENTS

| | | | |
|---|---|---|---|
| 2005/0006015 A1* | 1/2005 | Richards | B60C 11/03 152/209.2 |
| 2009/0266457 A1 | 10/2009 | Kojima | |
| 2012/0132333 A1 | 5/2012 | Ebiko et al. | |

FOREIGN PATENT DOCUMENTS

| | | | | |
|---|---|---|---|---|
| JP | H07-0179103 | 7/1995 | | |
| JP | H09-030213 | 2/1997 | | |
| JP | H11-0291714 | 10/1999 | | |
| JP | 2007-168572 | 7/2007 | | |
| JP | 2008195100 A | * 8/2008 | ......... | B60C 11/0304 |
| JP | 2009-262874 | 11/2009 | | |
| JP | 2010-076561 | 4/2010 | | |
| JP | 2012-116389 | 6/2012 | | |
| WO | WO 2012/073420 | 6/2012 | | |

OTHER PUBLICATIONS

Machine translation of JP2008-195100 (No date).*
Chinese Office Action for Chinese Patent Application No. 201480020668.0 dated Sep. 21, 2016, 6 pages.
International Search Report for International Application No. PCT/JP2014/060305 dated Jun. 24, 2014, 4 pages, Japan.

* cited by examiner

PNEUMATIC TIRE

TECHNICAL FIELD

The present technology relates to a pneumatic tire featuring pitch variations in its tread pattern.

BACKGROUND

Pneumatic tires featuring pitch variations in their tread patterns are conventionally known (see, for example, Japanese Unexamined Patent Application Publication Nos. H11-291714A, 2007-168572A and H7-179103A). Japanese Unexamined Patent Application Publication No. H11-291714A discloses a technique in which wet performance is improved by specifying pitch lengths, inclination angles of lateral grooves, and groove areas of the lateral grooves. Japanese Unexamined Patent Application Publication No. 2007-168572A discloses a technique in which noise performance is improved by specifying pitch lengths and widths of lateral grooves. Japanese Unexamined Patent Application Publication No. H7-179103A discloses a technique in which the noise performance by specifying the change ratio between groove cross-sectional areas.

In the techniques disclosed in Japanese Unexamined Patent Application Publication Nos. H11-291714A, 2007-168572A and H7-179103A, the inclination angles and areas of the lateral grooves, the groove widths of the lateral grooves, or the cross-sectional area change ratio for specific grooves must be specified in addition to the pitch lengths; thus, the design is complicated.

SUMMARY

The present technology provides a pneumatic tire obtained without having to make modifications to factors other than the pitch lengths, for example, the inclination angles of the lateral grooves, the groove areas, and the groove widths, that is, without the need for a complicated design, and in which the noise performance (in relation to pattern noise) is improved.

A pneumatic tire according to the present technology has a designated vehicle mounting direction and is provided with, in a tire tread portion, at least one main groove extending in a tire circumferential direction, and a plurality of inclined grooves intersecting with the main groove. On an inner vehicle-mounting side, in a region on an outer side in the tire width direction of the main groove positioned on the outermost side in the tire width direction, tire circumferential pitch lengths have pitch variations including at least three pitch lengths in a region formed of the inclined grooves and land portions adjacent to the inclined grooves on one side in the tire circumferential direction. When the number of pitches is set to n and pitch lengths Pi are each defined as Pi1, Pi2, Pi3, . . . , Pin in the order from the greatest pitch length, relationships of Pi1/Pi2≤Pi2/Pi3≤ . . . ≤Pin−1/Pin, and Pi1/Pi2<Pin−1/Pin are satisfied.

In the pneumatic tire according to the present technology, modifications are made only to the pitch length ratios based on the pitch lengths, and are not made to factors other than the pitch lengths. As a result, the pneumatic tire according to the present technology is obtained without a complicated design and is able to improve the noise performance (in relation to pattern noise).

DETAILED DESCRIPTION

Embodiments of the pneumatic tire according to the present technology (Basic Embodiment and Additional Embodiments 1 to 5 described below) will now be described on the basis of the drawings. Note that the present technology is not limited to these embodiments. Furthermore, the constituent elements of the embodiments include constituent elements that can be easily replaced by those skilled in the art, or constituent elements that are substantially the same. In addition, the various modes included in these embodiments can be combined as desired within the scope of obviousness by those skilled in the art.

Basic Embodiment

A basic embodiment of the pneumatic tire according to the present technology will now be described.

In the following description, "tire radial direction" refers to a direction orthogonal to the rotational axis of the pneumatic tire; "inner side in the tire radial direction" refers to a side that is near the rotational axis in the tire radial direction; and "outer side in the tire radial direction" refers to a side that is far from the rotational axis in the tire radial direction. Furthermore, "tire circumferential direction" refers to a direction around the rotational axis as the central axis. Additionally, "tire width direction" refers to a direction parallel to the rotational axis; "inner side in the tire width direction" refers to a side that is near a tire equatorial plane CL (tire equatorial line) in the tire width direction; and "outer side in the tire width direction" refers to a side that is far from the tire equatorial plane CL in the tire width direction. Note that "tire equatorial plane CL" refers to a plane that is orthogonal to the rotational axis of the pneumatic tire and that passes through the center of the tire width of the pneumatic tire.

Figure 1:
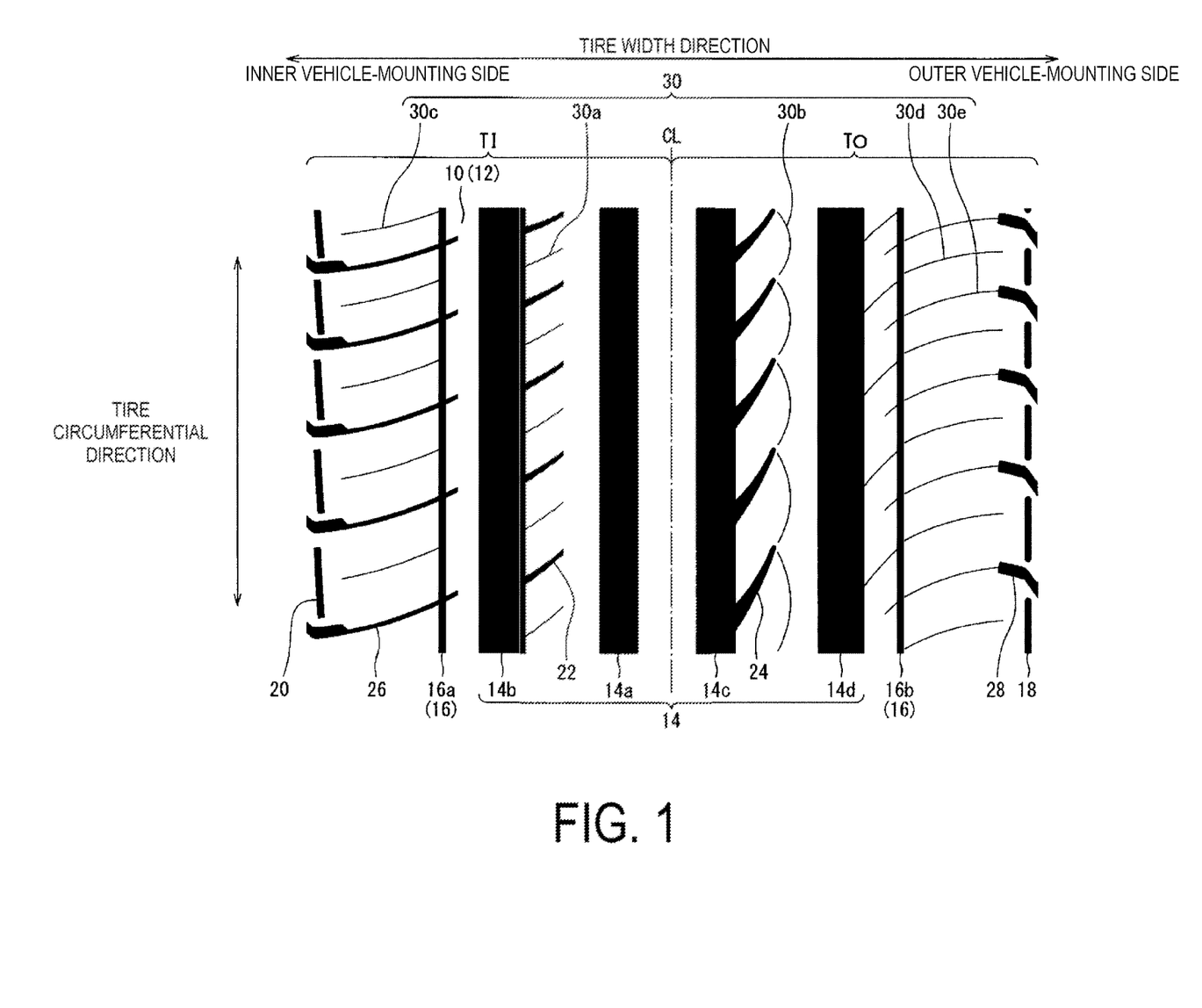
FIG. 1 is a plan view illustrating a tread portion of a pneumatic tire according to an embodiment of the present technology.

FIG. 1 is a plan view illustrating a tread portion of a pneumatic tire according to an embodiment of the present technology. A pneumatic tire 1 illustrated in FIG. 1 has a designated vehicle mounting direction. Also, in the same diagram, the side to the left of the tire equatorial plane CL is an inner vehicle-mounting side TI and the side to the right of the tire equatorial plane CL is an outer vehicle-mounting side TO. In addition, the pneumatic tire 1 has a tread portion 10. The tread portion 10 is formed from a rubber material (tread rubber) and is exposed on the outermost side in the tire radial direction of the pneumatic tire 1; thus, the surface thereof constitutes the profile of the pneumatic tire 1. The surface of the tread portion 10 forms a tread surface 12 constituting a surface that comes into contact with the road surface when a vehicle (not illustrated) upon which the pneumatic tire 1 is mounted is traveling.

As illustrated in FIG. 1, the tread surface 12 is provided with grooves 14, 16, and 18 extending in the tire circumferential direction, inclined grooves 20, 22, 24, 26, and 28 inclined relative to the tire circumferential direction, and sipes 30 to form the tread pattern illustrated in the same diagram. The specific configuration of the grooves 14 to 28 and the sipes 30 is as follows.

That is, the tread surface 12 is provided with circumferential main grooves 14 extending in the tire circumferential direction (a circumferential main groove 14a on the inner vehicle-mounting side TI and on the inner side in the tire width direction, a circumferential main groove 14b on the inner vehicle-mounting side TI and on the outer side in the tire width direction, a circumferential main groove 14c on the outer vehicle-mounting side TO and on the inner side in the tire width direction, and a circumferential main groove 14d on the outer vehicle-mounting side TO and on the outer side in the tire width direction). On the outer side in the tire width direction of the circumferential main groove 14b, a circumferential sub groove 16a with a narrower width than the circumferential main groove 14b is provided. On the outer side in the tire width direction of the circumferential main groove 14d, a circumferential sub groove 16b with a narrower width than the circumferential main groove 14d is provided. On the further outer side in the tire width direction beyond the circumferential sub groove 16b, a circumferential discontinuous groove 18 that extends discontinuously in the tire circumferential direction and is as narrow as the circumferential sub groove 16b is provided.

In addition, the tread surface 12 is provided, on the further outer side in the tire width direction beyond the circumferential sub groove 16a, with an inclined discontinuous groove 20 that is inclined relative to the tire circumferential direction, extends discontinuously in the tire circumferential direction, and is as narrow as the circumferential sub groove 16a. Provided are a plurality of inclined grooves 22 that extend from the inner side in the tire width direction of the circumferential main groove 14b, terminate in a land portion adjacent to the circumferential main groove 14b and are inclined relative to the tire circumferential direction. Provided are a plurality of inclined grooves 24 that extend from the outer side in the tire width direction of the circumferential main groove 14c and terminate in a land portion adjacent to the circumferential main groove 14c and are inclined relative to the tire circumferential direction. Provided are a plurality of inclined grooves 26 that intersect with a circumferential sub groove 16a, and in which the inner side ends in the tire width direction terminate in a land portion adjacent to the circumferential sub groove 16a and the outer side ends in the tire width direction extend on the outer side in the tire width direction of an inclined discontinuous groove 20. On the outer side in the tire width direction of the circumferential sub groove 16b, provided are a plurality of inclined grooves 28 that intersect with regions in the tire circumferential direction of the circumferential discontinuous groove 18 and are inclined relative to the tire circumferential direction.

Furthermore, sipes 30a that extend from the circumferential main groove 14b inward in the tire width direction and terminate in the land portion are provided to alternate with the inclined grooves 22 in the tire circumferential direction. Provided are a plurality of sipes 30b that extend between the vicinities of the outermost sections in the tire width direction of the inclined grooves 24, 24 adjacent to each other in the tire circumferential direction and have a shape convex outward in the tire width direction. Provided are sipes 30c that extend from the circumferential sub groove 16a outward in the tire width direction and terminate in the land portion are provided to alternate with the inclined grooves 26 in the tire circumferential direction. Sipes 30d that extend outward in the tire width direction from the circumferential main groove 14d beyond the circumferential sub groove 16b and terminate in the land portion are provided to alternate in the tire circumferential direction with sipes 30e that extend inward in the tire width direction from the inclined grooves 28 beyond the circumferential sub groove 16b and terminate in the land portion.

Under such a premise, in the example illustrated in FIG. 1, on the inner vehicle-mounting side TI, in a region on the outer side in the tire width direction of the circumferential main groove 14b positioned on the outermost side in the tire width direction, tire circumferential pitch lengths have pitch variations including at least three pitch lengths in a region formed of the inclined grooves 26 and land portions adjacent to the inclined grooves 26 on one side in the tire circumferential direction.

Figure 2:
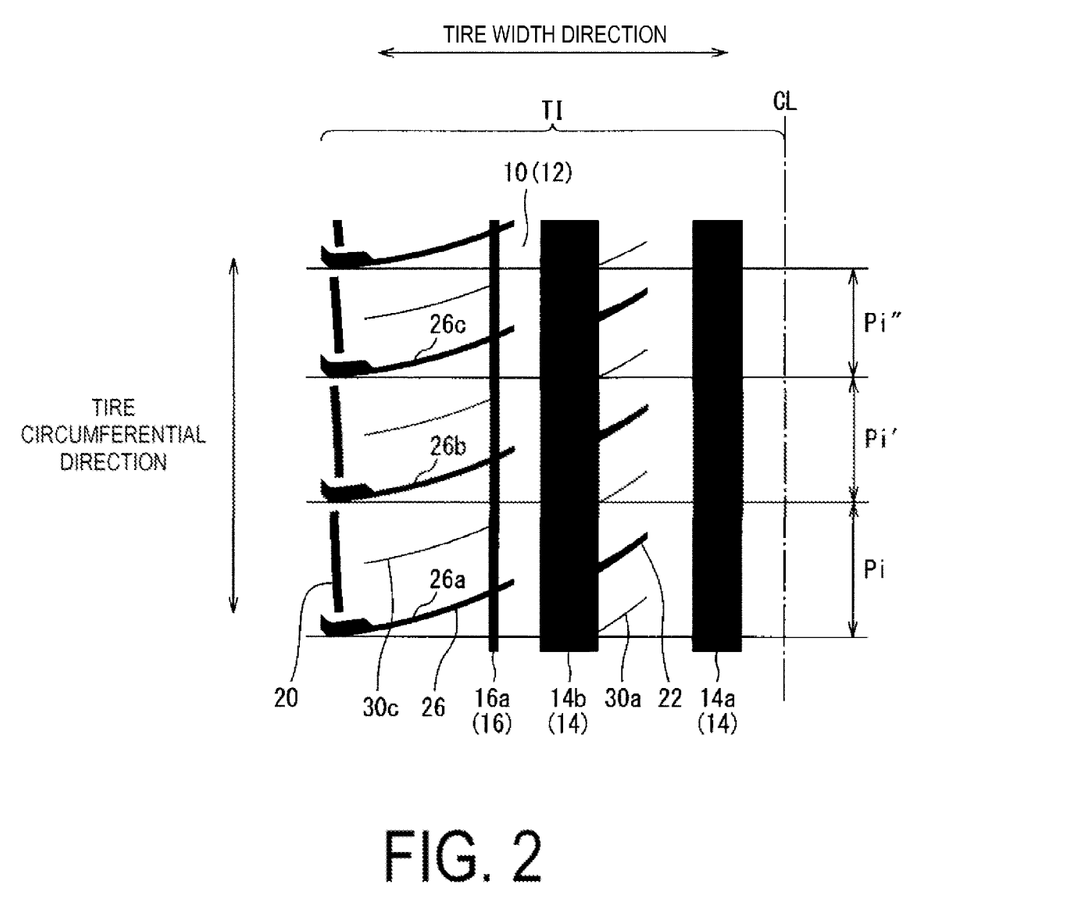
FIG. 2 is a plan view illustrating a part of an inner vehicle-mounting side TI in the tread portion illustrated in FIG. 1.

FIG. 2 is a plan view illustrating a part of the inner vehicle-mounting side TI of the tread portion illustrated in FIG. 1. Here, the arrangement of the grooves illustrated in FIG. 2 (in particular, the ratios of the tire-circumferential lengths) is not precisely reflected in FIG. 1, but the arrangement of the grooves on the inner vehicle-mounting side TI is in accordance with the arrangement in FIG. 2. In the example illustrated in FIG. 2, the tire circumferential pitch length on the inner vehicle-mounting side TI, with a focus on any of the inclined grooves 26 (26a, 26b, 26c, . . . ), for example, on the inclined groove 26a, refers to the dimensions in the tire circumferential direction from the end on one side (for example, the lower side in FIG. 2) in the tire circumferential direction of the inclined groove 26a up to the end on one side (for example, the lower side in FIG. 2) in the tire circumferential direction of an inclined groove 26b shaped identically to and adjacent to the inclined groove 26a in the tire circumferential direction.

Here, an inclined groove set as a reference when specifying the tire circumferential pitch length is not limited to the inclined groove 26 illustrated in FIG. 2, and may be another groove, such as the inclined groove 20 or the sipe 30c illustrated in the same diagram.

In the example illustrated in FIG. 2, the tread pattern has pitch variations including three pitch lengths on the inner vehicle-mounting side TI. For example, in a case where the inclined grooves 26 (the inclined groove 26a, the inclined groove 26b, and the inclined groove 26c) are set as reference inclined grooves, there are three pitch lengths including a pitch length Pi (reference: inclined groove 26a), a pitch length Pi' (reference: inclined groove 26b), and a pitch length Pi" (reference: inclined groove 26c).

Then, in the present embodiment, when the number of pitches is set to n and pitch lengths Pi are each defined as Pi1, Pi2, Pi3, . . . , Pin in the order from the greatest pitch length, relationships of Pi1/Pi2≤Pi2/Pi3≤, . . . , ≤Pin−1/Pin (first condition), and Pi1/Pi2<Pin−1/Pin (second condition) are satisfied.

In the example illustrated in FIG. 2, since the pitch length Pi, the pitch length Pi', and the pitch length Pi" are increased in size in this order, the Pi corresponds to the pitch length Pi1, the Pi' corresponds to the pitch length Pi2, and the Pi" corresponds to pitch length Pi3, relationships of Pi/Pi'≤Pi'/Pi" and Pi/Pi'<Pi'/Pi" are satisfied or, simply, a relationship of Pi/Pi'<Pi'/Pi" is satisfied.

(Action and the Like)

As described above, in the pneumatic tire 1 illustrated in FIG. 1, on the inner vehicle-mounting side TI, a plurality of circumferential pitch lengths are specified. On the basis of this, a plurality of the quotients (the results of division) of pitch lengths with values approximate to each other are obtained from among these pitch lengths, and the magnitude relationships of these quotients are specified. In addition, on the basis of the plurality of circumferential pitch lengths, the magnitude relationship between the quotient for the maximum pitch length and the quotient for the minimum pitch length is also specified. More specifically, the lengths are specified such that the quotient of circumferential pitch lengths with values approximate to each other is smaller for longer circumferential pitch lengths and, conversely, the quotient of circumferential pitch lengths with values approximate to each other is larger for shorter circumferential pitch lengths. In addition, the quotient for the maximum pitch length is specified to be smaller than the quotient for the minimum pitch length.

That is, using the first condition and the second condition, the plurality of pitch lengths are varied as a whole by reducing the minimum pitch length on the inner vehicle-mounting side where there is a high possibility of influencing the pattern noise to be measured in the vehicle compartment. As a result, it is possible to disperse the frequency of the pattern noise and to prevent the amplification action of the sounds in the same frequency band, and the noise performance (in relation to pattern noise) can be improved.

In the pneumatic tire 1 illustrated in FIG. 1, modifications have only been made to the pitch length ratios based on the pitch lengths, and not to factors other than pitch length. Specifically, the pneumatic tire 1 illustrated in FIG. 1 is not obtained by specifying factors other than pitch length, such as inclination angles, areas, or widths of the lateral grooves, as in the conventional art involving pitch variations (for example, Patent Documents 1 to 3). Therefore, the pneumatic tire illustrated in FIG. 1 can be obtained without the need for a complicated design.

As a result, the pneumatic tire according to the present embodiment can improve the noise performance (in relation to pattern noise) without the need for a complicated design simply by controlling a plurality of circumferential pitch lengths on the inner vehicle-mounting side.

Although it is not illustrated in the drawings, the pneumatic tire according to the present embodiment described above has a meridian cross-section form similar to that of a conventional pneumatic tire. Here, the meridian cross-section form of the pneumatic tire refers to the cross-sectional shape of the pneumatic tire on a plane normal to the tire equatorial plane. The pneumatic tire according to the present embodiment, when viewed in the tire meridian cross-section, includes a bead portion, a sidewall portion, a shoulder portion, and a tread portion, from the inner side toward the outer side in the tire radial direction. As seen, for example, when viewed in the tire meridian cross-section, the pneumatic tire is provided with a carcass layer that extends from the tread portion to the bead portions on both sides and is wound around a pair of bead cores, and a belt layer and a belt reinforcing layer formed in this order on the outer side in the tire radial direction of the carcass layer.

The pneumatic tire according to the present embodiment can be obtained via various ordinary manufacturing steps including a tire material mixing step, a tire material machining step, a green tire molding step, a vulcanization step, a post-vulcanization inspection step, and the like. When producing the pneumatic tire according to the present embodiment, in particular, a concave portion and a convex portion corresponding to a tread pattern having desired pitch variations are formed in the inner wall of a vulcanizing mold, which is used to perform vulcanization.

Additional Embodiments

Next, description will be given of additional embodiments 1 to 5 which can be optionally implemented as opposed to the above-described basic embodiment of the pneumatic tire according to the present technology.

Additional Embodiment 1

Additional Embodiment 1 is a mode in which, with respect to the basic embodiment, a modification is further added to the outer vehicle-mounting side TO. In other words, in the present embodiment, in the example illustrated in FIG. 1, on an outer vehicle-mounting side TO, in a region on the outer side in the tire width direction of the circumferential main groove 14d positioned on the outermost side in the tire width direction, tire circumferential pitch lengths have pitch variations including at least three pitch lengths in a region formed of the inclined grooves 28 and land portions adjacent to the inclined grooves 28 on one side in the tire circumferential direction.

Figure 3:
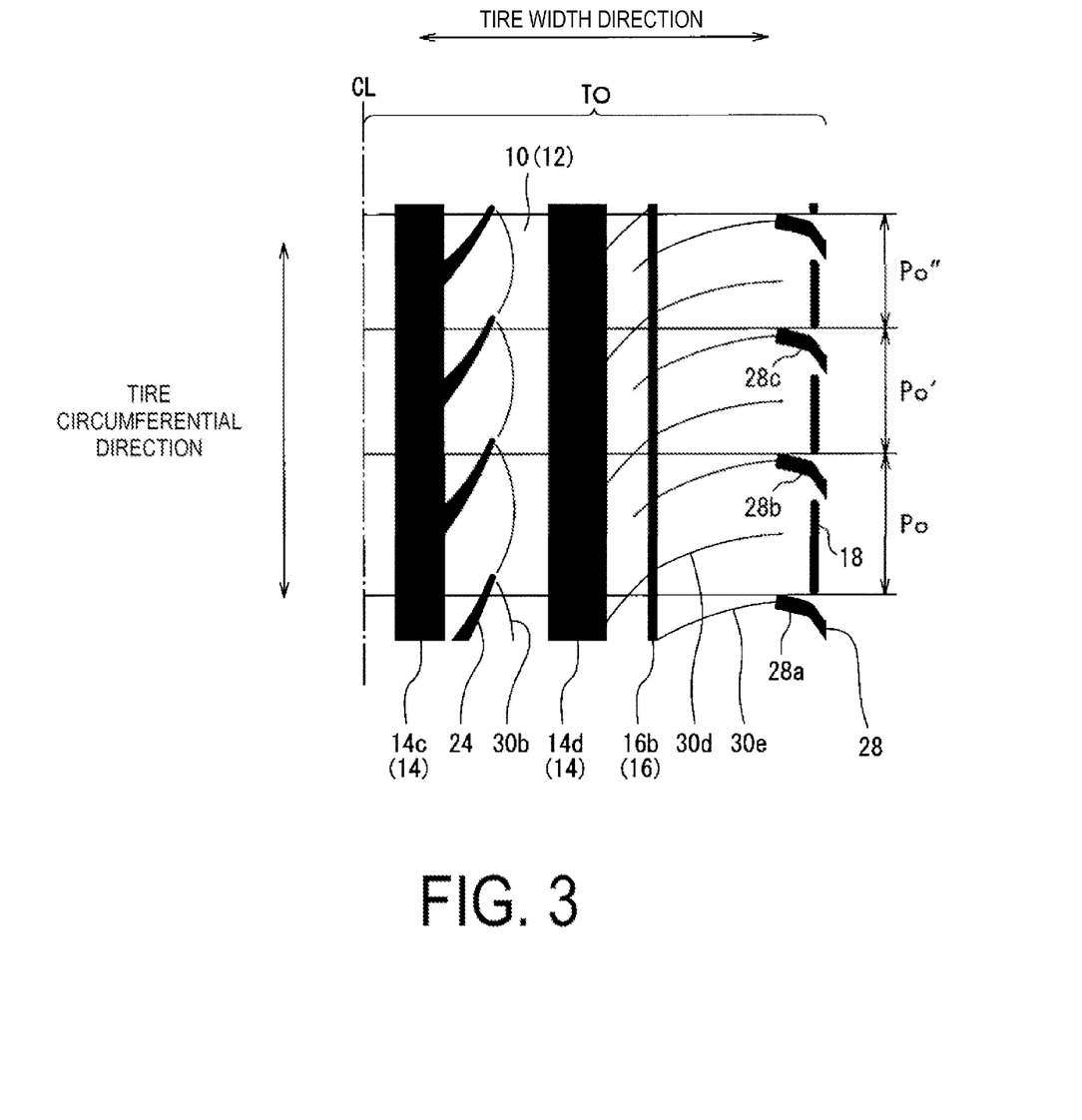
FIG. 3 is a plan view illustrating a part of an outer vehicle-mounting side TO in the tread portion illustrated in FIG. 1.

FIG. 3 is a plan view illustrating a part of the outer vehicle-mounting side TO of the tread portion illustrated in FIG. 1. Here, the arrangement of the grooves illustrated in FIG. 3 (in particular, the ratios of the tire-circumferential lengths) is not precisely reflected in FIG. 1, but the arrangement of the grooves on the outer vehicle-mounting side TO is in accordance with the arrangement in FIG. 3. In the example illustrated in FIG. 3, the tire circumferential pitch length on the outer vehicle-mounting side TO, with a focus on any of the inclined grooves 28 (28a, 28b, 28c, ...), for example, on the inclined groove 28a, refers to the dimensions in the tire circumferential direction from the end on one side (for example, the lower side in FIG. 3) in the tire circumferential direction of the inclined groove 28a up to the end on one side (for example, the lower side in FIG. 3) in the tire circumferential direction of the inclined groove 28b shaped identically to and adjacent to the inclined groove 28a in the tire circumferential direction.

Here, an inclined groove set as a reference when specifying the tire circumferential pitch length is not limited to the inclined groove 28 illustrated in FIG. 3, and may be another groove, such as the circumferential discontinuous groove 18, the sipe 30c, or the sipe 30e illustrated in the same diagram.

In the example illustrated in FIG. 3, the outer vehicle-mounting side TO has pitch variations including three pitch lengths. For example, in a case where the inclined grooves 28 (the inclined grooves 28a, 28b, and 28c) are set as reference grooves, there are three pitch lengths including a pitch length Po (reference: inclined groove 28a), a pitch length Po' (reference: inclined groove 28b), and a pitch length Po" (reference: inclined groove 28c).

Then, in the present mode (Additional Embodiment 1), when the number of pitches is set to n and pitch lengths Po are each defined as Po1, Po2, Po3, ..., Pon in this order from the greatest pitch length, relationships of Po1/Po2≥Po2/Po3≥, ..., ≥Pon−1/Pon (third condition) and Po1/Po2>Pon−1/Pon (fourth condition) are satisfied. In the example illustrated in FIG. 3, since the pitch length Po, the pitch length Po', and the pitch length Po" are increased in size in this order, the Po corresponds to the pitch length Po1, the Po' corresponds to the pitch length Po2, and the Po" corresponds to the pitch length Po3, and the relationships of Po/Po'≥Po'/Po" and Po/Po'>Po'/Po" are satisfied or, simply, a relationship of Po/Po'>Po'/Po", is satisfied.

As described above, in the pneumatic tire 1 of the present mode (Additional Embodiment 1), on the outer vehicle-mounting side TO, a plurality of circumferential pitch lengths are specified. On the basis of this, a plurality of the quotients (the results of division) of the pitch lengths with values approximate to each other obtained from among these pitch lengths, and the magnitude relationships of these quotients are specified. In addition, on the basis of the plurality of circumferential pitch lengths, the magnitude relationship between the quotient for the maximum pitch length and the quotient for the minimum pitch length is also specified. More specifically, the lengths are specified such that the quotient of circumferential pitch lengths with values approximate to each other is larger for longer circumferential pitch lengths and, conversely, the quotient of circumferential pitch lengths with values approximate to each other is smaller for shorter circumferential pitch lengths. In addition, the quotient for the maximum pitch length is specified to be larger than the quotient for the minimum pitch length.

That is, using the third condition and the fourth condition, on the outer vehicle-mounting side TO where the burden load difference is great during the tire rolling, the pitch length difference is suppressed over the entire tire circumferential direction by increasing the minimum pitch length whereby differences in the rigidity are reduced. As a result, it is possible to improve the steering stability performance on dry road surfaces.

Additional Embodiment 2

In the basic embodiment or a mode combining the Additional Embodiment 1 with the basic embodiment, on the inner vehicle-mounting side TI, the number of pitches of the pitch length Pi1 on the tire periphery is preferably smaller than the number of pitches of the Pin on the tire periphery (Additional Embodiment 2). As a result, on the inner vehicle-mounting side TI, it is possible to include a large number of portions with the smallest pitch length, which have a great impact on the satisfaction of the first condition and the second condition. As a result, it is possible to further vary the plurality of pitch lengths as a whole, and the noise performance (in relation to the pattern noise) can be further improved.

Additional Embodiment 3

In a mode combining at least the Additional Embodiment 1 with the basic embodiment, on the outer vehicle-mounting side TO, the number of pitches of the pitch length Po1 on the tire periphery is preferably smaller than the number of pitches of the Pon on the tire periphery (Additional Embodiment 3). As a result, on the outer vehicle-mounting side TO, it is possible to include a large number of portions with the smallest pitch length, which have a great impact on the satisfaction of the third condition and the fourth condition. As a result, it is possible to further reduce differences in rigidity by further suppressing differences in the pitch lengths over the entire tire circumferential direction, and the steering stability performance on dry road surfaces can be further improved.

Additional Embodiment 4

In a mode combining at least Additional Embodiment 1 with the basic embodiment, when the number of pitches is set to n, at least one of the pitch length ratio Pik−1/Pik where k is at least one of natural numbers from 2 to n on the inner vehicle-mounting side TI and the pitch length ratio Pok−1/Pok where k is at least one of natural numbers from 2 to n on the outer vehicle-mounting side TO is preferably in a range of 1.05 to 1.20 (Additional Embodiment 4).

By setting at least one of the pitch length ratio Pik−1/Pik and the pitch length ratio Pok−1/Pok to 1.05 or more, on the inner vehicle-mounting side TI and the outer vehicle-mounting side TO where this value is applied, it is possible to vary the dimensions between pitch lengths with similar dimensions to a certain extent. As a result, it is possible to disperse the frequency of sounds generated on the sides TI and TO and to prevent the amplification action of sounds in the same frequency band. As a result, on the inner vehicle-mounting side TI, it is possible to reduce pattern noise measured in the vehicle compartment, and the noise performance (in relation to pattern noise) can be further improved. In addition, on the outer vehicle-mounting side TO, it is possible to reduce pass-by noise measured outside the vehicle compartment, and the noise performance (in relation to pass-by noise) can be improved.

In addition, by setting at least one of the pitch length ratio Pik−1/Pik and the pitch length ratio Pok−1/Pok to 1.20 or less, on the inner vehicle-mounting side TI and the outer vehicle-mounting side TO where this value is applied, the dimensions between pitch lengths with similar dimensions are not varied more than necessary. As a result, it is possible to prevent local reductions in the rigidity on the sides TI and TO. As a result, the uneven wear resistance can be improved on the inner vehicle-mounting side TI where an amount of wear is great, while the steering stability performance on dry road surfaces can be further improved on the outer vehicle-mounting side TO where the burden load difference during the tire rolling is great.

Additional Embodiment 5

In a mode combining at least Additional Embodiment 1 with the basic embodiment, at least one of the ratio Pi1/Pin of the maximum pitch length Pi1 and the minimum pitch length Pin on the tire periphery on the inner vehicle-mounting side TI and the ratio Po1/Pon of the maximum pitch length Po1 and the minimum pitch length Pon on the tire periphery on the outer vehicle-mounting side TO is preferably in a range of 1.20 to 2.00 (Additional Embodiment 5).

By setting at least one of the ratio Pi1/Pin and the ratio Po1/Pon to 1.20 or more, it is possible for the inner vehicle-mounting side TI and the outer vehicle-mounting side TO where this value is applied to have variations between a plurality of pitch lengths. As a result, it is possible to disperse the frequency of sounds generated on the sides TI and TO and to prevent the amplification of sounds in the same frequency band. As a result, on the inner vehicle-mounting side TI, it is possible to reduce pattern noise measured in the vehicle compartment, and the noise performance (in relation to pattern noise) can be further improved. In addition, on the outer vehicle-mounting side TO, it is possible to reduce pass-by noise measured outside the vehicle compartment, and the noise performance (in relation to pass-by noise) can be further improved.

In addition, by setting at least one of the ratio Pi1/Pin and the ratio Po1/Pon to 2.00 or less, the variations between a plurality of pitch lengths are not increased more than necessary on the inner vehicle-mounting side TI and the outer vehicle-mounting side TO where this value is applied. As a result, it is possible to prevent local reductions in the rigidity on the sides TI and TO. As a result, the uneven wear resistance can be further improved on the inner vehicle-mounting side TI where an amount of wear is great, while the steering stability on dry road surfaces can be further improved on the outer vehicle-mounting side TO where the burden load difference during the tire rolling is large.

WORKING EXAMPLES

Pneumatic tires (each test tire) of a conventional example and Working Examples 1 to 7 were each manufactured with (Steering Stability Performance)

For the steering stability performance, sensory evaluation was performed by a panel when traveling on dry road surfaces at a speed of 120 km/h. Then, on the basis of the evaluation results, index evaluation was performed with the conventional example set as a reference (100). Higher index values indicate a better steering stability performance.

TABLE 1

|  |  | Conventional Example | Working Example 1 | Working Example 2 | Working Example 3 | Working Example 3 | Working Example 4 | Working Example 5 | Working Example 6 | Working Example 7 |
|---|---|---|---|---|---|---|---|---|---|---|
| Pitch ratio I | Pi1/Pi2 | 1.05 | 1.06 | 1.06 | 1.06 | 1.06 | 1.02 | 1.15 | 1.03 | 1.06 |
|  | Pi2/Pi3 | 1.05 | 1.10 | 1.10 | 1.10 | 1.10 | 1.03 | 1.18 | 1.10 | 1.10 |
|  | Pi3/Pi4 | 1.05 | 1.13 | 1.13 | 1.13 | 1.13 | 1.04 | 1.20 | 1.16 | 1.13 |
|  | Pi4/Pi5 | 1.05 | 1.16 | 1.16 | 1.16 | 1.16 | 1.05 | 1.24 | 1.22 | 1.16 |
| Pitch ratio O | Po1/Po2 | 1.05 | 1.16 | 1.10 | 1.16 | 1.16 | 1.06 | 1.26 | 1.16 | 1.22 |
|  | Po2/Po3 | 1.05 | 1.13 | 1.13 | 1.13 | 1.13 | 1.05 | 1.24 | 1.13 | 1.16 |
|  | Po3/Po4 | 1.05 | 1.10 | 1.10 | 1.10 | 1.10 | 1.04 | 1.20 | 1.10 | 1.10 |
|  | Po4/Po5 | 1.05 | 1.06 | 1.06 | 1.06 | 1.06 | 1.03 | 1.15 | 1.06 | 1.03 |
| Magnitude pitch ratio I (Pi1/Pi5) |  | 1.22 | 1.53 | 1.53 | 1.53 | 1.53 | 1.15 | 2.02 | 1.60 | 1.53 |
| Magnitude pitch ratio O (Po1/Po5) |  | 1.22 | 1.53 | 1.45 | 1.53 | 1.53 | 1.19 | 2.16 | 1.53 | 1.60 |
| Magnitude relationship I of number of pitches |  | Pi1 < Pi5 | Pi1 < Pi5 | Pi1 < Pi5 | Pi1 > Pi5 | Pi1 < Pi5 | Pi1 < Pi5 | Pi1 < Pi5 | Pi1 < Pi5 | Pi1 < Pi5 |
| Magnitude relationship O of number of pitches |  | Po1 < Po5 | Po1 < Po5 | Po1 < Po5 | Po1 < Po5 | Po1 > Po5 | Po1 < Po5 | Po1 < Po5 | Po1 < Po5 | Po1 < Po5 |
| Noise performance (in relation to pattern noise) |  | 100 | 110 | 110 | 107 | 110 | 103 | 113 | 110 | 103 |
| Steering stability performance |  | 100 | 110 | 105 | 110 | 107 | 113 | 103 | 103 | 110 | the tire size set to 215/45R17 87W, with the tread pattern illustrated in FIG. 1 to FIG. 3, with the number of pitches being 5, and with the pitch length ratio (pitch ratio I) on the inner vehicle-mounting side, the pitch length ratio (pitch ratio O) on the outer vehicle-mounting side, the maximum-minimum pitch length ratio (magnitude pitch ratio I) on the inner vehicle-mounting side, the maximum-minimum pitch length ratio (magnitude pitch ratio O) on the outer vehicle-mounting side, the magnitude relationship (magnitude relationship I of number of pitches) between the number of maximum pitch lengths and the number of minimum pitch lengths on the inner vehicle-mounting side and the magnitude relationship (magnitude relationship O of number of pitches) between the number of maximum pitch lengths and the number of minimum pitch lengths on the outer vehicle-mounting side having the values shown in Table 1.

Each of the tires thus manufactured was attached to a 17x7J rim with an air pressure of 230 kPa and mounted on a sedan-type vehicle (front-engine front-drive type) having an engine displacement of 1800 CC, and the noise performance (in relation to pattern noise) and the steering stability performance were evaluated. The results are illustrated in Table 1.

(Noise Performance)

For the noise performance (in relation to pattern noise), an overall value was measured (measured in the vehicle compartment) while traveling at a speed of 100 km/h on a smooth road surface and index evaluation was performed with the conventional example set as a reference (100). Higher index values indicate better noise performance.

According to Table 1, all of the pneumatic tires of Working Example 1 to Working Example 7 within the technical scope of the present technology (in which the pitch ratio I and the magnitude relationships (magnitude relationships of Pi1/Pi2 and Pi4/Pi5) between the pitch length ratio for the maximum pitch length and the pitch length ratio for the minimum pitch length on the inner vehicle-mounting side TI are within a predetermined range) were determined to have at least excellent noise performance in comparison with the pneumatic tire of the conventional example which does not fall within the technical scope of the present technology.

The present technology includes the following aspects.

(1) A pneumatic tire with a designated vehicle mounting direction, including, in a tire tread portion, at least one main groove extending in a tire circumferential direction; and a plurality of inclined grooves intersecting with the main groove, in which, on an inner vehicle-mounting side, in a region on an outer side in the tire width direction of the main groove positioned on an outermost side in the tire width direction, tire circumferential pitch lengths have pitch variations including at least three pitch lengths in a region formed of the inclined grooves and land portions adjacent to the inclined grooves on one side in the tire circumferential direction and, when a number of pitches is set to n and pitch lengths Pi are each defined as Pi1, Pi2, Pi3, ..., Pin in the order from a greatest pitch length, relationships of Pi1/Pi2≤Pi2/Pi3≤ ... ≤Pin−1/Pin, and Pi1/Pi2<Pin−1/Pin are satisfied (2) The pneumatic tire according to (1), wherein, on an outer vehicle-mounting side, a region on the outer side in the tire width direction of the main groove positioned on the outermost side in the tire width direction, the tire circumferential pitch lengths have pitch variations including at least three pitch lengths in a region formed of the inclined grooves and land portions adjacent to the inclined grooves on one side in the tire circumferential direction and, when the number of pitches is set to n and pitch lengths Po are each defined as Po1, Po2, Po3, . . . , Pon in the order from the greatest pitch length, relationships of Po1/Po2≥Po2/Po3≥, . . . , ≥Pon−1/Pon, and Po1/Po2>Pon−1/Pon are satisfied.

(3) The pneumatic tire according to (1) or (2), wherein, on the inner vehicle-mounting side, the number of pitches of the pitch length Pi1 on the tire periphery is smaller than the number of pitches of the Pin on the tire periphery.

(4) The pneumatic tire according to (2) or (3), wherein, on the outer vehicle-mounting side, the number of pitches of the pitch length Po1 on the tire periphery is smaller than the number of pitches of the Pon on the tire periphery.

(5) The pneumatic tire according to any one of (2) to (4), wherein, if the number of pitches is n, at least one of a pitch length ratio Pik−1/Pik where k is at least one of natural numbers from 2 to n on the inner vehicle-mounting side and a pitch length ratio Pok−1/Pok where k is at least one of natural numbers from 2 to n on the outer vehicle-mounting side is in a range of 1.05 to 1.20.

(6) The pneumatic tire according to any one of (2) to (5), wherein at least one of a ratio Pi1/Pin between the maximum pitch length Pi1 and the minimum pitch length Pin on the tire periphery on the inner vehicle-mounting side and a ratio Po1/Pon between the maximum pitch length Po1 and the minimum pitch length Pon on the tire periphery on the outer vehicle-mounting side is in a range of 1.20 to 2.00.

What is claimed is:

1. A pneumatic tire with a designated vehicle mounting direction, comprising:
    in a tire tread portion, four main grooves and two narrow grooves extending in a tire circumferential direction, each of the narrow grooves having a smaller groove width than a groove width of each of the four main grooves;
    five land portions defined by the four main grooves; and
    a plurality of inclined grooves intersecting with at least one of the four main grooves;
    wherein the five land portions comprise a center land portion including an equatorial plane, two intermediate land portions, and two shoulder land portions, one of the two narrow grooves being disposed in each of the two shoulder land portions,
    wherein at least the center land portion and the two intermediate land portions out of the five land portions are ribs,
    wherein the plurality of inclined grooves in each of the two intermediate land portions open to the main groove defining a corresponding intermediate land portion on a inner vehicle-mounting side and do not open to the main groove defining a corresponding intermediate land portion on an outer vehicle-mounting side,
    wherein the plurality of inclined grooves in each of the two intermediate land portions terminate in the intermediate land portions,
    on the inner vehicle-mounting side, in a region on an outer side in a tire width direction of one main groove of the at least one of the four main grooves, the one main groove being positioned on an outermost side in the tire width direction, tire circumferential pitch lengths have pitch variations including at least three pitch lengths in a region formed of the inclined grooves and land portions adjacent to the inclined grooves on one side in the tire circumferential direction;
    when a number of pitches is n and pitch lengths Pi are each defined as Pi1, Pi2, Pi3, . . . , Pin in order from a greatest pitch length, relationships of Pi1/Pi2<Pi2/Pi3<, . . . <Pin−1/Pin, and Pi1/Pi2<Pin−1/Pin are satisfied;
    the pitch lengths Pi are arranged in order from the greatest pitch length to a smallest pitch length;
    each of the pitch lengths Pi in the arrangement Pi1, Pi2, Pi3, . . . , Pin is provided a single time in the arrangement Pi1, Pi2, Pi3, . . . , Pin and is different from each immediately adjacent pitch length in the arrangement Pi1, Pi2, Pi3, . . . , Pin; and
    on the inner vehicle-mounting side, a number of pitches of the pitch length Pi1 on a tire periphery is smaller than a number of pitches of the pitch length Pin on the tire periphery.

2. The pneumatic tire according to claim 1, wherein on the outer vehicle-mounting side, in a region on an outer side in the tire width direction of another one of the at least four main grooves, tire circumferential pitch lengths have pitch variations including at least three pitch lengths in a region formed of the inclined grooves and land portions adjacent to the inclined grooves on one side in the tire circumferential direction; and
    when a number of pitches is n and pitch lengths Po are each defined as Po1, Po2, Po3, . . . , Pon in the order from a greatest pitch length, relationships of Po1/Po2≥Po2/Po3≥, . . . , ≥Pon−1/Pon, and Po1/Po2>Pon−1/Pon are satisfied.

3. The pneumatic tire according to claim 2, wherein
    on the outer vehicle-mounting side, a number of pitches of the pitch length Po1 on a tire periphery is smaller than a number of pitches of the pitch length Pon on the tire periphery.

4. The pneumatic tire according to claim 2, wherein
    when a number of pitches is n, at least one of a pitch length ratio Pik−1/Pik where k is at least one of natural numbers from 2 to n on the inner vehicle-mounting side and a pitch length ratio Pok−1/Pok where k is at least one of natural numbers from 2 to n on the outer vehicle-mounting side is in a range of 1.05 to 1.20.

5. The pneumatic tire according to claim 2, wherein
    at least one of a ratio Pi1/Pin between a maximum pitch length Pi1 and a minimum pitch length Pin on a tire periphery on the inner vehicle-mounting side and a ratio Po1/Pon between a maximum pitch length Po1 and a minimum pitch length Pon on the tire periphery on the outer vehicle-mounting side is in a range of 1.20 to 2.00.

6. The pneumatic tire according to claim 2, wherein
    on the inner vehicle-mounting side, a number of pitches of the pitch length Pi1 on a tire periphery is smaller than a number of pitches of the pitch length Pin on the tire periphery.

7. The pneumatic tire according to claim 6, wherein
    on the outer vehicle-mounting side, a number of pitches of the pitch length Po1 on the tire periphery is smaller than a number of pitches of the pitch length Pon on the tire periphery.

8. The pneumatic tire according to claim 7, wherein
    when a number of pitches is n, at least one of a pitch length ratio Pik−1/Pik where k is at least one of natural numbers from 2 to n on the inner vehicle-mounting side and a pitch length ratio Pok−1/Pok where k is at least one of natural numbers from 2 to n on the outer vehicle-mounting side is in a range of 1.05 to 1.20.

9. The pneumatic tire according to claim 8, wherein at least one of a ratio Pi1/Pin between a maximum pitch length Pi1 and a minimum pitch length Pin on the tire periphery on the inner vehicle-mounting side and a ratio Po1/Pon between a maximum pitch length Po1 and a minimum pitch length Pon on the tire periphery on the outer vehicle-mounting side is in a range of 1.20 to 2.00.

10. The pneumatic tire according to claim 1, wherein when a number of pitches is n, at least one of a pitch length ratio Pik−1/Pik where k is at least one of natural numbers from 2 to n on the inner vehicle-mounting side and a pitch length ratio Pok−1/Pok where k is at least one of natural numbers from 2 to n on the outer vehicle-mounting side is in a range of 1.05 to 1.20.

11. The pneumatic tire according to claim 1, wherein at least one of a ratio Pi1/Pin between a maximum pitch length Pi1 and a minimum pitch length Pin on the tire periphery on the inner vehicle-mounting side and a ratio Po1/Pon between a maximum pitch length Po1 and a minimum pitch length Pon on the tire periphery on the outer vehicle-mounting side is in a range of 1.20 to 2.00.

12. The pneumatic tire according to claim 3, wherein when a number of pitches is n, at least one of a pitch length ratio Pik−1/Pik where k is at least one of natural numbers from 2 to n on the inner vehicle-mounting side and a pitch length ratio Pok−1/Pok where k is at least one of natural numbers from 2 to n on the outer vehicle-mounting side is in a range of 1.05 to 1.20.

13. The pneumatic tire according to claim 3, wherein at least one of a ratio Pi1/Pin between a maximum pitch length Pi1 and a minimum pitch length Pin on the tire periphery on the inner vehicle-mounting side and a ratio Po1/Pon between a maximum pitch length Po1 and a minimum pitch length Pon on the tire periphery on the outer vehicle-mounting side is in a range of 1.20 to 2.00.

14. The pneumatic tire according to claim 4, wherein at least one of a ratio Pi1/Pin between a maximum pitch length Pi1 and a minimum pitch length Pin on a tire periphery on the inner vehicle-mounting side and a ratio Po1/Pon between a maximum pitch length Po1 and a minimum pitch length Pon on the tire periphery on the outer vehicle-mounting side is in a range of 1.20 to 2.00.

15. The pneumatic tire according to claim 1, wherein the plurality of inclined grooves intersects only one main groove and no other inclined grooves.

16. The pneumatic tire according to claim 1, wherein the center land portion does not include any inclined grooves or sipes.

17. The pneumatic tire according to claim 1, wherein at least one of the two shoulder land portions is a rib.

18. The pneumatic tire according to claim 2, wherein at least one of a ratio Pi1/Pin between a maximum pitch length Pi1 and a minimum pitch length Pin on a tire periphery on the inner vehicle-mounting side and a ratio Po1/Pon between a maximum pitch length Po1 and a minimum pitch length Pon on the tire periphery on the outer vehicle-mounting side is in a range of 1.70 to 2.00.

19. A pneumatic tire with a designated vehicle mounting direction, comprising:
in a tire tread portion, four main grooves and two narrow grooves extending in a tire circumferential direction, each of the narrow grooves having a smaller groove width than a groove width of each of the four main grooves;
five land portions defined by the four main grooves; and
a plurality of inclined grooves intersecting with at least one of the four main grooves;
wherein the five land portions comprise a center land portion including an equatorial plane, two intermediate land portions, and two shoulder land portions, one of the two narrow grooves being disposed in each of the two shoulder land portions,
wherein at least the center land portion and the two intermediate land portions out of the five land portions are ribs,
wherein the plurality of inclined grooves in each of the two intermediate land portions open to the main groove defining a corresponding intermediate land portion on a inner vehicle-mounting side and do not open to the main groove defining a corresponding intermediate land portion on an outer vehicle-mounting side,
wherein the plurality of inclined grooves in each of the two intermediate land portions terminate in the intermediate land portions,
on the inner vehicle-mounting side, in a region on an outer side in a tire width direction of one main groove of the at least one of the four main grooves, the one main groove being positioned on an outermost side in the tire width direction, tire circumferential pitch lengths have pitch variations including at least three pitch lengths in a region formed of the inclined grooves and land portions adjacent to the inclined grooves on one side in the tire circumferential direction;
when a number of pitches is n and pitch lengths Pi are each defined as Pi1, Pi2, Pi3, . . . , Pin in order from a greatest pitch length, relationships of Pi1/Pi2<Pi2/Pi3<, . . . <Pin−1/Pin, and Pi1/Pi2<Pin−1/Pin are satisfied;
the pitch lengths Pi are arranged in order from the greatest pitch length to a smallest pitch length;
each of the pitch lengths Pi in the arrangement Pi1, Pi2, Pi3, . . . , Pin is provided a single time in the arrangement Pi1, Pi2, Pi3, . . . , Pin and is different from each immediately adjacent pitch length in the arrangement Pi1, Pi2, Pi3, . . . , Pin;
on the outer vehicle-mounting side, in a region on an outer side in the tire width direction of another one of the at least four main grooves, tire circumferential pitch lengths have pitch variations including at least three pitch lengths in a region formed of the inclined grooves and land portions adjacent to the inclined grooves on one side in the tire circumferential direction;
when a number of pitches is n and pitch lengths Po are each defined as Po1, Po2, Po3, . . . , Pon in the order from a greatest pitch length, relationships of Po1/Po2≥Po2/Po3≥, . . . , ≥Pon−1/Pon, and Po1/Po2>Pon−1/Pon are satisfied; and
on the outer vehicle-mounting side, a number of pitches of the pitch length Po1 on a tire periphery is smaller than a number of pitches of the pitch length Pon on the tire periphery.

20. The pneumatic tire according to claim 1, wherein an inclination angle of the inclined grooves remains constant between different pitch lengths.

* * * * *